United States Patent
Li et al.

(10) Patent No.: US 9,479,312 B2
(45) Date of Patent: Oct. 25, 2016

(54) METHOD AND APPARATUS FOR INTERFERENCE CONTROL

(75) Inventors: Chaofeng Li, Beijing (CN); Ming Lei, Beijing (CN); Wei Xu, Beijing (CN); Le Liang, Beijing (CN); Hua Zhang, Beijing (CN); Shi Jin, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 3 days.

(21) Appl. No.: 14/385,036

(22) PCT Filed: Jun. 7, 2012

(86) PCT No.: PCT/CN2012/076585
§ 371 (c)(1),
(2), (4) Date: Dec. 22, 2014

(87) PCT Pub. No.: WO2013/181823
PCT Pub. Date: Dec. 12, 2013

(65) Prior Publication Data
US 2015/0110020 A1    Apr. 23, 2015

(51) Int. Cl.
*H04L 5/00* (2006.01)
*H04B 15/00* (2006.01)
(Continued)

(52) U.S. Cl.
CPC ........... *H04L 5/0053* (2013.01); *H04B 7/0617* (2013.01); *H04B 7/0619* (2013.01); *H04B 7/0626* (2013.01); *H04B 15/00* (2013.01); *H04W 76/023* (2013.01)

(58) Field of Classification Search
CPC .. H04B 7/0617; H04B 7/0619; H04B 15/00; H04B 7/0626; H04W 76/023; H04L 5/0053
See application file for complete search history.

(56) References Cited

U.S. PATENT DOCUMENTS

| | | | |
|---|---|---|---|
| 2008/0056414 A1* | 3/2008 | Kim | H04B 7/063 375/347 |
| 2009/0046594 A1 | 2/2009 | Zhou et al. | |
| 2009/0247175 A1* | 10/2009 | van Rensburg | H04L 5/0023 455/450 |

(Continued)

FOREIGN PATENT DOCUMENTS

| | | |
|---|---|---|
| CN | 101227255 A | 7/2008 |
| CN | 101848023 A | 9/2010 |

(Continued)

OTHER PUBLICATIONS

Communication dated Nov. 10, 2015 from the Japanese Patent Office in counterpart application No. 2014-561256.

(Continued)

*Primary Examiner* — Brian D Nguyen
(74) *Attorney, Agent, or Firm* — Sughrue Mion, PLLC

(57) ABSTRACT

Methods and apparatuses for interference control have been disclosed. A method for a base station in a wireless communication system, comprising: obtaining a system setting of the wireless communication system; selecting a transmission mode based at least in part on the system setting, wherein the transmission mode is one of an Interference Cancellation IC transmission mode and a Beamforming BF transmission mode; and configuring the selected transmission mode. The total system throughput may be maximized by dynamically switching the transmission mode between IC and BF at the base station. Further, the proposed switching mechanism may be applied to various communication networks where downlink interference may occur.

22 Claims, 8 Drawing Sheets

(51) Int. Cl.
  *H04W 76/02* (2009.01)
  *H04B 7/06* (2006.01)

(56) References Cited

U.S. PATENT DOCUMENTS

| | | | |
|---|---|---|---|
| 2010/0061438 A1* | 3/2010 | Tan | H04L 1/0003 375/227 |
| 2010/0080323 A1* | 4/2010 | Mueck | H04J 11/0033 375/296 |
| 2011/0122971 A1* | 5/2011 | Kim | H04B 7/0417 375/316 |
| 2012/0099540 A1* | 4/2012 | Doppler | H04J 11/0033 370/329 |
| 2012/0177018 A1* | 7/2012 | Abraham | H04L 1/0027 370/338 |

FOREIGN PATENT DOCUMENTS

| | | |
|---|---|---|
| CN | 102067697 A | 5/2011 |
| CN | 102388541 A | 3/2012 |
| JP | 2004-260467 A | 9/2004 |
| JP | 2006-520109 A | 8/2006 |
| JP | 2006-319959 A | 11/2006 |
| JP | 2007-251924 A | 9/2007 |
| JP | 2008-504730 A | 2/2008 |
| JP | 2010-533454 A | 10/2010 |
| JP | 4908506 B2 | 4/2012 |
| WO | 2009/041069 A1 | 4/2009 |
| WO | 2010/084411 A1 | 7/2010 |
| WO | 2011/035201 A2 | 3/2011 |
| WO | 2012/015737 A1 | 2/2012 |

OTHER PUBLICATIONS

International Search Report for PCT/CN2012/076585 dated Mar. 14, 2013 [PCT/ISA/210].
Written Opinion for PCT/CN2012/076585 dated Mar. 14, 2013 [PCT/ISA/237].
Chinese Office Action Search Report related to Chinese Application No. 2012800717085; dated Aug. 29, 2016.
Chinese Office Action related to Chinese Application No. 201280071708.5; dated Aug. 29, 2016.

* cited by examiner

METHOD AND APPARATUS FOR INTERFERENCE CONTROL

CROSS REFERENCE TO RELATED APPLICATIONS

This application is a National Stage of International Application No. PCT/CN2012/076585 filed Jun. 7, 2012, the contents of all of which are incorporated herein by reference in their entirety.

FIELD OF THE INVENTION

Embodiments of the present invention generally relate to communication systems, and more particularly to a method, an apparatus, a base station, and a computer program for interference control for wireless communication systems.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3GPP Third Generation Partnership Project
BF Beamforming
BS Base Station
CSI Channel State Information
D2D Device-to-Device
DL Downlink
eNB enhanced NodeB, Base Station in E-UTRAN
FDD Frequency Division Duplex
IC Interference Cancellation
LTE Long Term Evolution
RB Resource Block
RS Reference Signal
TDD Time Division Duplex
UE User Equipment
UL Uplink The device-to-device (D2D) communication strategy has attracted considerable attention as an underlay to current cellular networks. It enables user equipments (UE) to communicate with nearby user terminals directly over a D2D link without the help of cellular base stations (BS). The D2D strategy is particularly beneficial to serve the demand for high rate local data transmission and also capable of enhancing cell throughput and increasing spectral efficiency by reusing cellular resources.

Since the D2D link reuses the cellular frequency resource, the inter-channel interference (ICI) between the cellular and D2D links exists and sometimes the ICI can severely deteriorate the entire system performance. In order to mitigate the negative effect of ICI, a direct and intuitive way is to use orthogonal resource allocation, e.g., resource blocks (RB) assignment in LTE, for the cellular and the D2D links. It has been reported that the best performance by orthogonal resource allocation is achieved when transmit powers of both D2D transmitter and the cellular BS are maximized as they do not interfere with each other.

The orthogonal resource allocation schemes, however, do not fully achieve the frequency reuse gain, and hence lowers the spectrum efficiency. For performance enhancement, non-orthogonal frequency reuse strategies are recently investigated. For this case, a critical issue is to properly coordinate existing interference to guarantee both reliable macro cellular and D2D communications as they simultaneously reuse the same frequency and time resources.

To alleviate the cellular interference to the D2D links, interference cancellation (IC) precoding at the base station may be a good candidate. In "Interference-avoiding MIMO schemes for device-to-device radio underlaying cellular networks," P. Janis, V. Koivunen, C. B. Ribeiro, K. Doppler, and K. Hugl, *IEEE $20^{th}$ International Symp. On Personal, Indoor and Mobile radio Commun. (PIMRC)*, December 2009, pp. 2385-2389, a novel interference cancellation (IC) precoder scheme for cellular DL transmission in the presence of D2D links is proposed. However, the IC scheme comes at the cost of reducing cellular users' signal power and hence decreases their achievable rates. In addition, the proposed IC scheme ignores the influences of path loss effects and limited feedback.

In contrast, eigen-beamforming (BF) scheme at the base station is capable of increasing cellular users' signal strength while causing more severe interference to D2D receivers at the same time.

SUMMARY OF THE INVENTION

To better address one or more of the above concerns, an adaptive transmission scheme to switch between IC/BF at the base station needs to be proposed to maximize a total system throughput in a wireless communication system where downlink interference occurs, especially in a system containing both cellular and D2D communications.

In a first aspect of the invention, a method for a base station BS in a wireless communication system is provided. The method comprises: obtaining a system setting of the wireless communication system; selecting a transmission mode based at least in part on the system setting, wherein the transmission mode is one of an Interference Cancellation IC transmission mode and a Beamforming BF transmission mode; and configuring the selected transmission mode.

In the wireless communication system, the BS communicates with a cellular user equipment UE via a cellular link and a Device-to-Device D2D transmitting UE communicates with a D2D receiving UE via a D2D link.

In some embodiments, the system setting may comprise at least one or more of: transmit power at the BS and transmit power at the D2D transmitting UE; number of antennas at the BS; and path loss information of the D2D receiving UE and the cellular UE.

In some embodiments, obtaining the system setting further comprises: informing the cellular UE and the D2D receiving UE of reference signal information of the D2D transmitting UE; and receiving the path loss information fed back from the cellular UE and the D2D receiving UE.

In one embodiment, the system setting further comprises a feedback size of channel state information.

In some embodiments, selecting the transmission mode further comprises: selecting the transmission mode which maximizes achievable channel capacity based on the system setting.

In one embodiment, configuring the selected transmission mode comprises: broadcasting pilot symbols, receiving downlink channel state information feedback; and performing precoding for the selected transmission mode based on the downlink channel state information feedback.

In another embodiment, configuring the selected transmission mode comprises: estimating uplink channel state information; deriving downlink channel state information from the uplink channel state information; and performing precoding for the selected transmission mode based on the downlink channel state information.

In some embodiments, selecting the transmission mode further comprises: obtaining downlink channel state information; calculating achievable channel capacity for both the IC transmission mode and the BF transmission mode based at least in part on the downlink channel state information and the system setting; and selecting the transmission mode which maximizes the achievable rate.

In some embodiments, obtaining downlink channel state information further comprises: estimating uplink channel state information; and deriving the downlink channel state information from the uplink channel state information.

In some embodiments, configuring the selected transmission mode comprises: performing precoding for the selected transmission mode based on the downlink channel state information.

In a second aspect of the invention, an apparatus is provided to implement various embodiments of the method of the first aspect of the invention. The apparatus for a base station BS in a wireless communication system, may comprise: an obtaining unit, configured to obtain a system setting of the wireless communication system; a selecting unit, configured to select a transmission mode based at least in part on the system setting, wherein the transmission mode is one of an Interference Cancellation IC transmission mode and a Beamforming BF transmission mode; and a configuring unit, configured to configure the selected transmission mode.

In a third aspect of the invention, an apparatus for a base station BS in a wireless communication system is provided, which comprises means for implementing each step of the method of the first aspect of the invention.

In a fourth aspect of the invention, an apparatus for a base station BS in a wireless communication system is provided, which comprises at least one processor and at least one memory including computer program code. The memory and the computer program code are configured to cause the processor to perform embodiments of the method of the first aspect of the invention.

In a fifth aspect of the invention, a computer program product is provided, which, comprises at least one computer readable storage medium having a computer readable program code portion stored thereon. The computer readable program code portion comprises program code instructions for perform embodiments of the method of the first aspect of the invention.

Particular embodiments of the subject matter described in this specification can be implemented so as to realize one or more of the following advantages.

With particular embodiments of the techniques described in this specification, the total system throughput may be maximized by dynamically switching the transmission mode between IC and BF at the base station. Operating regions of IC/BF are presented under different system settings, and based on this, the optimal one of IC and BF precoding strategies is employed to maximize the system throughput. Further, the proposed switching scheme may be applied to various communication networks where downlink interference may occur, including but not limited to, cellular system (e.g., FDD system or TDD system) with or without D2D communications.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Figure 1:
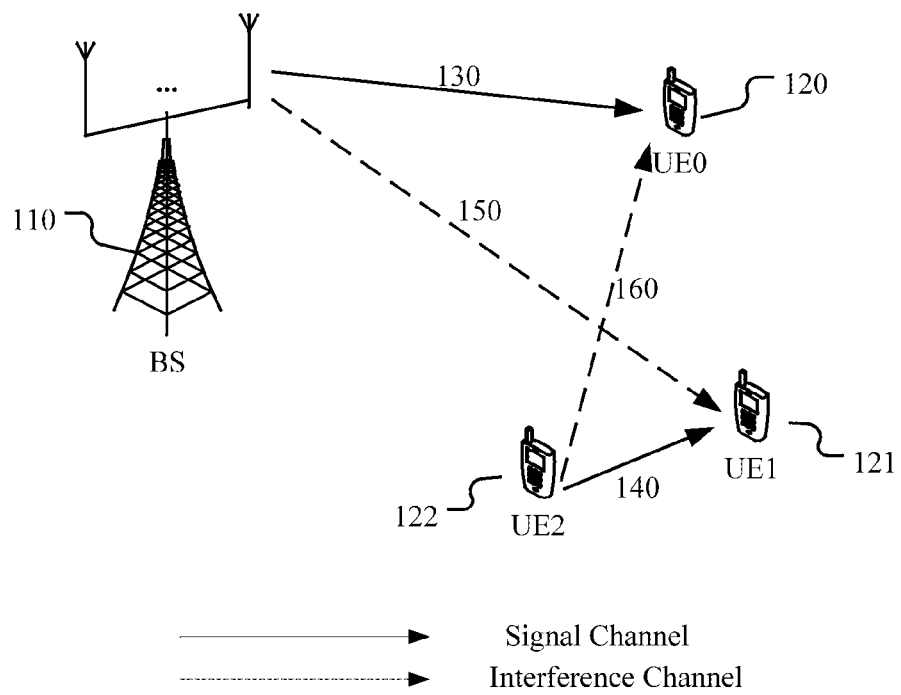
FIG. 1 illustrates an exemplary scenario where embodiments of the present invention may be implemented.

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Wireless communication systems include a network of devices for providing wireless connectivity to wireless-enabled devices including mobile units, smart phones, tablet devices, laptops, desktops, and other types of user equipment. The network access devices include base stations, base station routers, access points, e-node-Bs (eNBs), and the like. The entities within the wireless communication system generally conform to standards and/or protocols that facilitate communication over the air interface. For example, wireless communication systems are currently being developed that operate according to the Long Term Evolution (LTE) standards and/or protocols defined by the Third Generation Partnership Project (3GPP, 3GPP2). The LTE-Advanced standard supports both frequency division duplexing (FDD) and time division duplexing (TDD).

As mentioned above, an adaptive transmission scheme to switch between IC/BF at the base station needs to be proposed to maximize a total system throughput in a wireless communication system where downlink interference may occur.

For determining the proper transmission mode, closed-form expressions for both IC and BF transmission modes (i.e., precoding strategies) may be derived, which provide insights into the influences of various system settings on the throughput performance of the system.

To perform either IC or BF precoding, downlink channel knowledge is required at the base station. Full channel state information at the transmitter (CSIT), i.e., perfect CSIT, can enable the cellular BS to make the best decision on the resource sharing mode. Such condition may be satisfied in TDD systems due to channel reciprocity. However, in FDD systems, limited feedback with channel state information (CSI) quantization will be a common solution.

Thus, closed-form expressions for both IC and BF precoding strategies under perfect and quantized CSI feedback are derived. According to those expressions, operating regions of IC and BF may be presented under different system settings, and thus switching of transmission mode may be implemented to maximize system throughput based on it.

Hereinafter, details of various embodiments of the invention will be described with reference to the accompanying drawings.

FIG. 1 illustrates an exemplary scenario where embodiments of the present invention may be implemented. A D2D communication system underlaying cellular networks is depicted.

As illustrated in FIG. 1, there is an M-antenna BS 110 and three single-antenna remote user equipments referred to as UE0 120, UE1 121, and UE2 122, respectively. UE0 120 is the macro cellular user served by the BS 110. As shown in FIG. 1, the BS 110 communicates with the cellular UE0 120 via a cellular link 130. UE1 121 and UE2 122 within the BS 110 serving cell constitute a D2D link via direct communication. As shown in FIG. 1, the D2D transmitting UE2 122 communicates with the D2D receiving UE1 121 via a D2D link 140.

During the downlink phase, the BS 110 transmits a symbol to the UE0 120 e.g. via the cellular link 130, and meanwhile the UE2 122 sends a symbol to the UE1 121 e.g. via the D2D link 140. The macro link 130 from BS 110 to UE0 120 and the D2D link 140 from UE2 122 to UE1 121 share the same cellular resources under a centralized control by the macro BS 110. Thus, the downlink signal from the BS 110 would interfere with the reception of the D2D signal at the UE1 121, as indicated by the signal channel 150. Meanwhile, the D2D signal from the UE2 122 would interfere with the reception of the cellular downlink signal at the UE0 120, as indicated by the signal channel 160.

Following, based on the above depicted exemplary scenario, closed-form throughput expressions for both IC and BF strategies under perfect CSIT and quantized channel knowledge conditions will be derived. The transmit power is constrained by $P_B$ and $P_2$ for the cellular BS 110 and the D2D transmitting UE2 122, respectively. Note that, Lowercase boldface letters represent vectors and $E[\bullet]$ is the expectation operator. $|\bullet|$ returns the absolute value of a scalar and $\|\bullet\|$ gives the norm of a vector. C denotes the complex spaces and $Pr(\bullet)$ gives the probability of an event.

By assuming normalized symbols $s_0$ and $s_2$, i.e., $E[\|s\|^2]=1$, intended for UE0 120 and UE2 122, respectively, the received symbol at the cellular user UE0 120 is:

$$y_0 = \sqrt{\alpha_{B0}P_B} h_{B0}^H w s_0 + \sqrt{\alpha_{20}P_2} h_{20} s_2 + n_0 \qquad (1)$$

where $h_{B0} \in C^{M \times 1}$ and $h_{20} \in C^{1 \times 1}$ represent the macro link BS-UE0 130 and the UE2-UE0 interference link 160 respectively with their entries modeled as independent and identically distributed (i.i.d.) zero mean and unit variance complex Gaussian variables. Note that w is the precoding vector at the BS 110 while no precoding operation is required at the UE2 122 side since the D2D transmitting UE2 122 has only a single antenna. Path loss effects are characterized by defining $\alpha_{ij} \triangleq (D_0/D_{ij})^\eta$, where $D_0$ is the reference distance and $D_{ij}$ is the length of the characterized link. Note that the subscripts are selected from the set {B, 0, 1, 2} where B represents the BS 110 and other integers denote the corresponding UE terminals 120-122. The parameter $\eta$ can be determined through practical measurement and a typical value of $\eta$ is 4. $n_0$ models the normalized additive Gaussian noise with zero mean experienced at UE0 120, i.e., $n_0 \sim CN(0,1)$. At the same transmission time duration, the received symbol at the D2D user UE1 121 is:

$$y_1 = \sqrt{\alpha_{21}P_2} h_{21} s_2 + \sqrt{\alpha_{B1}P_B} h_{B1}^H w s_0 + n_1 \qquad (2)$$

where all parameters and variables share similar definitions as in (1).

According to (1) and (2), the received signal-to-noise-plus-interference ratio (SINR) at UE0 120 and UE1 121 are given by:

$$\gamma_0 = \frac{\alpha_{B0} P_B |h_{B0}^H w|^2}{\alpha_{20} P_2 |h_{20}|^2 + 1} \quad (3)$$

and $$\gamma_1 = \frac{\alpha_{21} P_2 |h_{21}|^2}{\alpha_{B1} P_B |h_{B1}^H w|^2 + 1}, \quad (4)$$

respectively. Hence, the achievable channel capacity of the entire system may be expressed by:

$$\mathcal{R} = E[\log_2(1+\gamma_0)] + E[\log_2(1+\gamma_1)] \quad (5)$$

Then, the sum capacity will be characterized by deriving closed-form expressions with w chosen by IC and BF precoding strategies under different CSIT cases, where w is precoding vector.

In the derivation, the following two Lemmas will be used.

Lemma 1: for two random variables $x \sim x_{2L}^2$, $y \sim x_2^2$, and positive constants a and b, we have $$R_1(a,b,L) \triangleq E\left[\log_2\left(1 + \frac{x}{ay+b}\right)\right] \quad (6)$$

$$= \frac{1}{\ln 2} \sum_{k=0}^{L-1} \sum_{m=0}^{K} \frac{b^m}{m!a} \begin{bmatrix} \left(\frac{1}{a}-1\right)^{m-k-1} e^b \Gamma(k+1)\Gamma(-k,b) - \\ \sum_{j=1}^{k-m+1} \sum_{i=0}^{k} \binom{k}{i}\left(-\frac{1}{a}\right)^i a^{-k+i+j-1} e^{\frac{b}{a}} \times \\ \Gamma\left(k-i-j+1, \frac{b}{a}\right)\left(\frac{1}{a}-1\right)^{m-k+j-2} \end{bmatrix}.$$

Lemma 2: for a random variable $x \sim x_2^2$ and positive constant $\delta$, we have $$R_2(\delta) \triangleq E[\log_2(1+\delta x)] = \frac{1}{\ln 2} e^{\frac{1}{\delta}} E_1\left(\frac{1}{\delta}\right) \quad (7)$$

Where $$E_1(z) = \int_z^\infty \frac{e^{-t}}{t} dt$$

is the exponential integral function of the first order.

First, we assume that perfect CSIT is available at the BS 110 for calculating w according to BF or IC.

A. Beamforming (BF) Case Under Perfect CSI

When leveraging BF strategy, the BS 110 aims at serving its cellular user UE0 120 without doing interference cancellation for the D2D receiving UE1 121. Then, according to the BF criterion via receiving power maximization, the precoding vector w should align with the same direction as the channel itself. It gives $$w = h_{B0}/\|h_{B0}\| \quad (8)$$

Then, the throughput of BF strategy with perfect CSIT can be directly obtained as follows $$\mathcal{R}_{CSIT}^{BF} = E[\log_2(1+\gamma_{0,CSIT}^{BF})] + E[\log_2(1+\gamma_{1,CSIT}^{BF})] \quad (9)$$

$$= R_1\left(\frac{\alpha_{20} P_2}{\alpha_{B0} P_B}, \frac{1}{\alpha_{B0} P_B}, M\right) + R_1\left(\frac{\alpha_{B1} P_B}{\alpha_{21} P_2}, \frac{1}{\alpha_{21} P_2}, 1\right)$$

Where $R_1(\bullet,\bullet,\bullet)$ follows from (6) given in Lemma 1.

B. Interference Cancellation (IC) Case Under Perfect CSI

When the IC strategy is exploited, the transmit weight vector w is chosen by nulling the interference to the D2D receiving UE1 121 while maximizing the term $|h_{B0}^H w|$ with w chosen in the direction of the projection of $h_{B0}$ on the null space of $h_{B1}$. Based on this, the system throughput of the IC strategy with perfect CSIT may be derived as:

$$\mathcal{R}_{CSIT}^{IC} = E[\log_2(1+\gamma_{0,CSIT}^{IC})] + E[\log_2(1+\gamma_{1,CSIT}^{IC})] \quad (10)$$

$$= R_1\left(\frac{\alpha_{20} P_2}{\alpha_{B0} P_B}, \frac{1}{\alpha_{B0} P_B}, M-1\right) + R_2(\alpha_{21} P_2)$$

Where $R_1(\bullet,\bullet,\bullet)$ and $R_2(\bullet)$ follow from (6) and (7), respectively.

Figure 2:
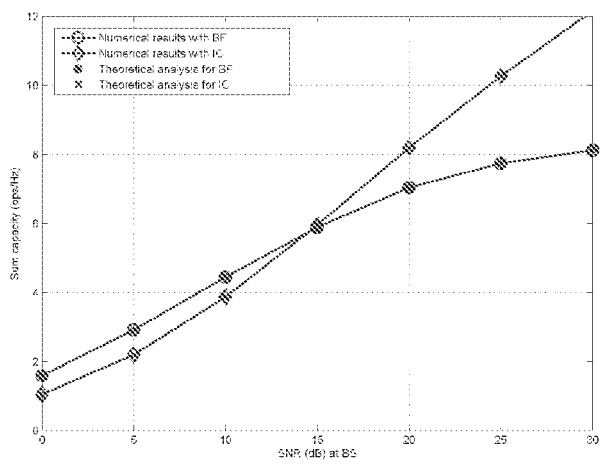
FIG. 2 illustrates the numerical results and the theoretical analysis results for BF and IC precoding strategies under perfect CSI.

FIG. 2 illustrates the numerical results and the theoretical analysis results for BF and IC precoding strategies under perfect CSI. In the plot in FIG. 2, the horizontal axis represents SNR (dB) at the BS, and the vertical axis represents the sum capacity (bps/Hz). Other parameters are as follows: M=2, $P_2 = P_B/20$, $D_0 = 100$ m, $D_{B0} = 100$ m, $D_{B1} = 300$ m, $D_{21} = 40$ m, $D_{20} = 250$ m, $\alpha_{B0} = (D_0/D_{B0})^n$, and $\eta = 1.2$.

As shown in FIG. 2, the theoretical analysis results coincide well with the numerical results. As the SNR at BS increases, i.e., the transmit power, the IC precoding strategy is superior to the BF precoding strategy.

Then, we consider the scenario where the BS 110 gets downlink channel knowledge through limited feedback (LF) from both cellular user UE0 120 and D2D user UE1 121.

C. Beamforming (BF) Case Under Quantized CSI

Here with only quantized CSI at BS, we assume the BS takes its quantized CSI feedback $\hat{h}_{B0}$ as the beamforming vector w. The normalized version $\tilde{h}_{B0}$ of the channel $h_{B0}$ can be decomposed as:

$$\tilde{h}_{B0} = \sqrt{1-Z}\hat{h}_{B0} + \sqrt{Z}s \quad (11)$$

Where s is an isotropic vector in the null space of $\hat{h}_{B0}$. The random variable Z represents the quantization error and follows $$E[Z] = (M-1)/M 2^{-\frac{B}{M-1}} \triangleq \varepsilon,$$

where M is the number of transmit antenna and B is the feedback size.

Then, the system throughput of BF strategy with limited feedback may be derived as:

$$\mathcal{R}_{LF}^{BF} = R_1\left(\frac{\alpha_{20} P_2}{\alpha_{B0} P_B (1-\varepsilon)}, \frac{1}{\alpha_{B0} P_B (1-\varepsilon)}, M\right) + R_1\left(\frac{\alpha_{B1} P_B}{\alpha_{21} P_2}, \frac{1}{\alpha_{21} P_2}, 1\right) \quad (12)$$

Where $R_1(\bullet,\bullet,\bullet)$ follows from (6).

D. Interference Cancellation (IC) Case Under Quantized CSI

When performing IC strategy under quantized CSI feedback, the precoding vector w is chosen in the direction of the projection vector of quantized macro link CSI $\hat{h}_{B0}$ on the null space of the quantized D2D link CSI $\hat{h}_{B1}$. Different from the perfect CSIT case, it is hard to obtain the exact distribution for the SINR at UE0 120. Therefore, in order to make the problem tractable, we resort to some approximation which will be shown useful and accurate by numerical results.

Then, the system throughput of IC strategy with limited feedback can be derived as:

$$\mathcal{R}_{LF}^{IC} = \qquad (13)$$
$$R_1\left(\frac{\alpha_{20}P_2}{\alpha_{B0}P_B(1-\varepsilon)}, \frac{1}{\alpha_{B0}P_B(1-\varepsilon)}, M-1\right) + R_1\left(\frac{\alpha_{B1}P_B\mu}{\alpha_{21}P_2}, \frac{1}{\alpha_{21}P_2}, 1\right)$$

Where $R_1(\cdot,\cdot,\cdot)$ is defined in Lemma 1, $$\mu = 2^{-\frac{B}{M-1}},$$

$\varepsilon$ shares the similar definitions as in BF case under limited feedback CSI.

Figure 3:
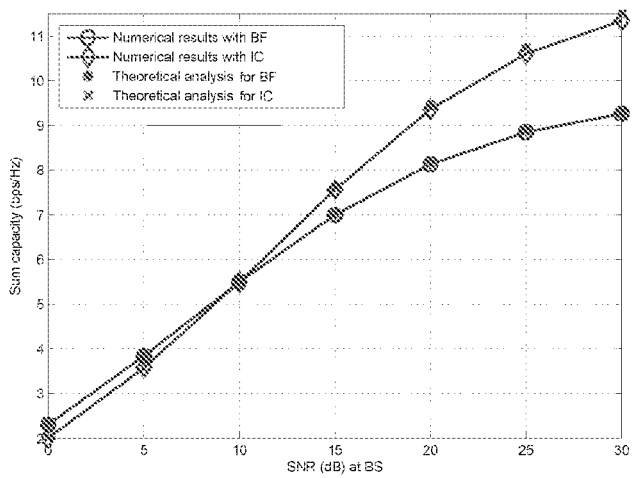
FIG. 3 illustrates the numerical results and the theoretical analysis results for BF and IC precoding strategies under limited feedback CSI.

FIG. 3 illustrates the numerical results and the theoretical analysis results for BF and IC precoding strategies under quantized CSI. In the plot in FIG. 3, the horizontal axis represents SNR (dB) at the BS, and the vertical axis represents the sum capacity (bps/Hz). Other parameters are as follows: M=4, B=14 bits, $P_2=P_B/20$, $D_0=100$ m, $D_{B0}=100$ m, $D_{B1}=300$ m, $D_{21}=40$ m, $D_{20}=250$ m, $\alpha_{B0}=(D_0/D_{B0})^\eta$, and $\eta=1.2$.

As shown in FIG. 3, the theoretical analysis results coincide well with the numerical results. As the SNR at BS increases, i.e., the transmit power, the IC precoding strategy is superior to the BF precoding strategy. Compared with the plot in FIG. 2, it can be seen the influence due to the limited feedback of CSI, that is, as the SNR at BS increases, the sum capacity for BF precoding strategy increases slowly and tends to flatten, but in FIG. 2, the sum capacity for BF precoding almost increases linearly with respect to the SNR at BS.

It can be observed from FIGS. 2 and 3 that the BF strategy outperforms IC strategy at the low SNR region due to its capability to direct available power to increase cellular signal strength. However, the IC strategy is preferred at medium to high SNRs because it can alleviate the dominating degrading influence on the D2D receiver, i.e., substantial cellular interference.

This observation motivates the inventors to adaptively switch between BF and IC strategies to maximize entire system throughput. Assuming the strategy set S={BF, IC}, the BF/IC switching scheme may be designed according to:

$$s = \underset{s \in S}{\mathrm{argmax}} \mathcal{R}_s \qquad (14)$$

where Rs follows from (12) and (13) for BF and IC strategies under quantized CSI scenarios, respectively. Note that for the perfect CSIT case, the switching criterion value Rs comes from (9) and (10) for BF and IC, respectively.

As indicated in the throughput expressions, the superiority of BF for IC strategies varies depending on the system setting which comprises the system transmit power, number of antennas at the BS, the distance relations between the cellular BS and D2D users, in other words, the path loss, and the optional feedback size.

Figure 4:
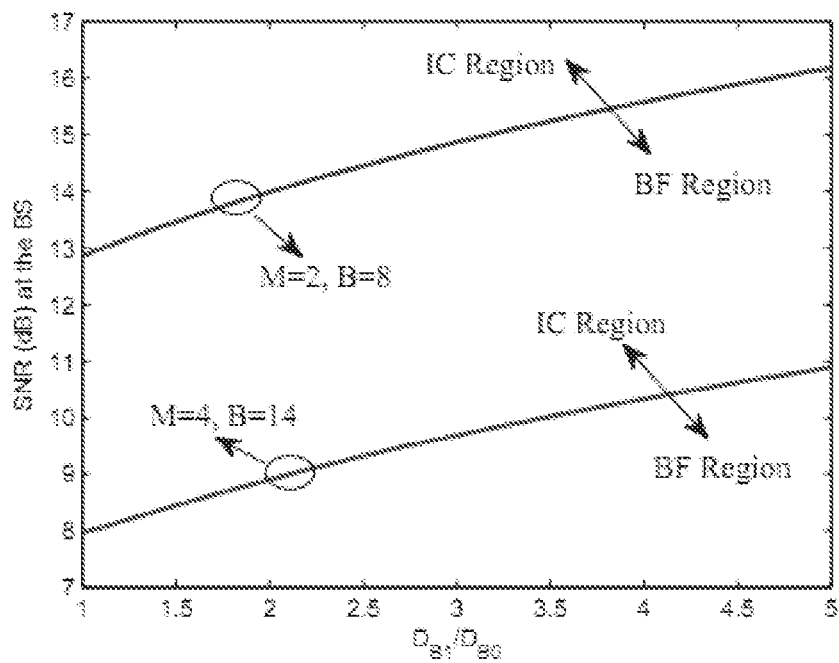
FIG. 4 illustrates the operating regions of BF and IC precoding strategies under different system settings.

FIG. 4 illustrates the operating regions of BF and IC strategies with respect to the system transmit power and the ratio of distances of BS-UE1 and BS-UE0 links under two different system settings. In the plot in FIG. 4, the horizontal axis represents the ratio of distances of BS-UE1 and BS-UE0 links, and the vertical axis represents the SNR at the BS. The curve 410 represents one system setting that M=2, B=8 bits, and $P_2=P_B/20$. The curve 420 represents another system setting that M=4, B=14 bits, and $P_2=P_B/20$. Above the curve 410/420, it is IC region, and below the curve 410/420, it is BF region.

The operating regions in FIG. 4 are intuitively satisfying as the BF scheme gets higher possibility to be chosen when the D2D receiver UE1 is much further to the BS than the cellular user UE0 and also when the transmit power is high. This is due to BF's capability to fully leverage available power to increase its own signal strength as previously explained.

Thus, according to the operating region of both BF and IC strategies under certain system settings, an adaptive transmission strategy to switch between BF and IC precoding is proposed to achieve maximum system throughput.

In the following description, the proposed switching mechanism will be detailed with respect to exemplary embodiments illustrated in the drawings. The exemplary embodiments will be discussed in the context of a wireless communication system containing both cellular communication and D2D communications, for example, the scenario as illustrated in FIG. 1. However, the skilled in the art could appreciated that the proposed switching mechanism may be applied in other wireless communication system where downlink interference may occur, and operating regions of BF/IC in those systems may be derived similarly.

Figure 5:
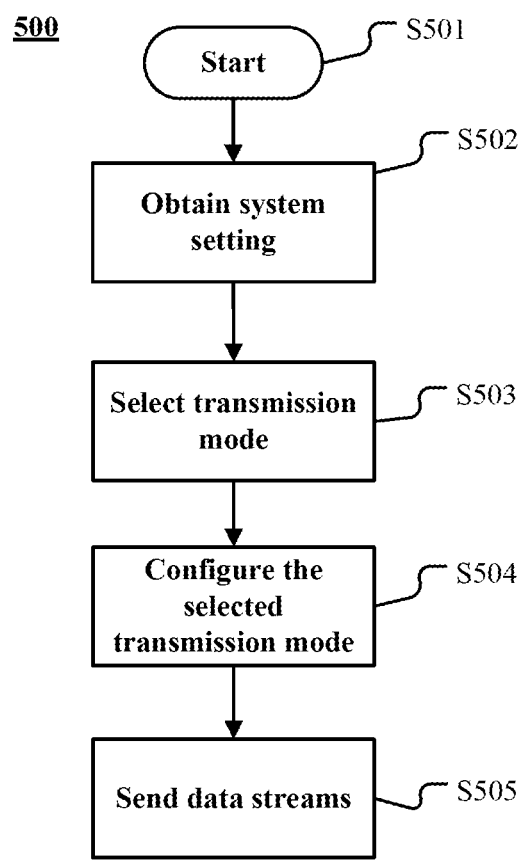
FIG. 5 illustrates an exemplary flowchart of a method 500 according to embodiments of the present invention.

FIG. 5 illustrates an exemplary flowchart of a method 500 according to embodiments of the present invention. The method 500 may be performed for a base station, e.g., BS 110, serving a cell. The skilled in the art could understand that the method 500 may be performed by an entity in the base station, or an entity in the other network element or by multiple entities distributed among various network elements, such as base station, radio network controller (RNC), Media Gateway (MGW), etc.

As shown in FIG. 5, the method 500 may begin at the step S501 and proceed to the step S502. At the step S502, a system setting of the wireless communication system may be obtained.

As discussed with respect to the derivation of those expressions, the system setting may comprise transmit power at the BS 110 and transmit power at the D2D transmitting UE2 122; number of antennas at the BS 110; and path loss information of the D2D receiving UE1 121 and the cellular UE0 120. Optionally, the system setting may further comprise the feedback size of CSI.

Normally, the transmit power at the BS 110 and at the D2D transmitting UE2 122 and the number of antennas at the BS 110 may be fixed or known beforehand. To obtain the path loss information of the D2D receiving UE1 121 and the cellular UE0 120, the following steps may be performed.

After the cellular link 130 and the D2D link are setup, both the cellular UE0 120 and the D2D receiving UE1 121 estimate their experienced path loss, and then feed this information back to the BS. For the path loss information of UE2-UE1 and UE2-UE0 links, the BS 110 informs the cellular UE0 120 and the D2D receiving UE1 121 of reference signal (RS) information of the D2D transmitting UE2 122. Then, the path loss of UE2-UE1 and UE2-UE0 links can be estimated at UE0 120 and UE1 121, respectively. This information is then fed back to the BS 110 by UE0 120 and UE1 121.

Then, at the step S503, a transmission mode is selected based at least in part on the system setting, wherein the transmission mode is one of an Interference Cancellation IC transmission mode and a Beamforming BF transmission mode. The selecting of the transmission mode aims at maximizing achievable channel capacity based on the obtained system setting.

In some embodiments, the selecting may be performed according to the operating regions e.g. as illustrated in FIG. 4, which shows whether IC or BF is preferred under certain system settings.

Then, at the step S504, the selected transmission mode will be configured. In particular, the precoding vector w for the selected transmission mode will be calculated based on the downlink channel state information.

Finally, at the step S505, both the cellular BS 110 and the D2D transmitting UE2 122 may send data streams to their receivers with the configured transmission mode. Note that, the D2D transmitting UE2 122 requires no precoding as it is equipped with only a single antenna.

Depending on different system configuration, for example TDD or FDD system, the selecting and configuring steps may vary. In the following, detailed description will be given with respect to different system configurations.

Figure 6:
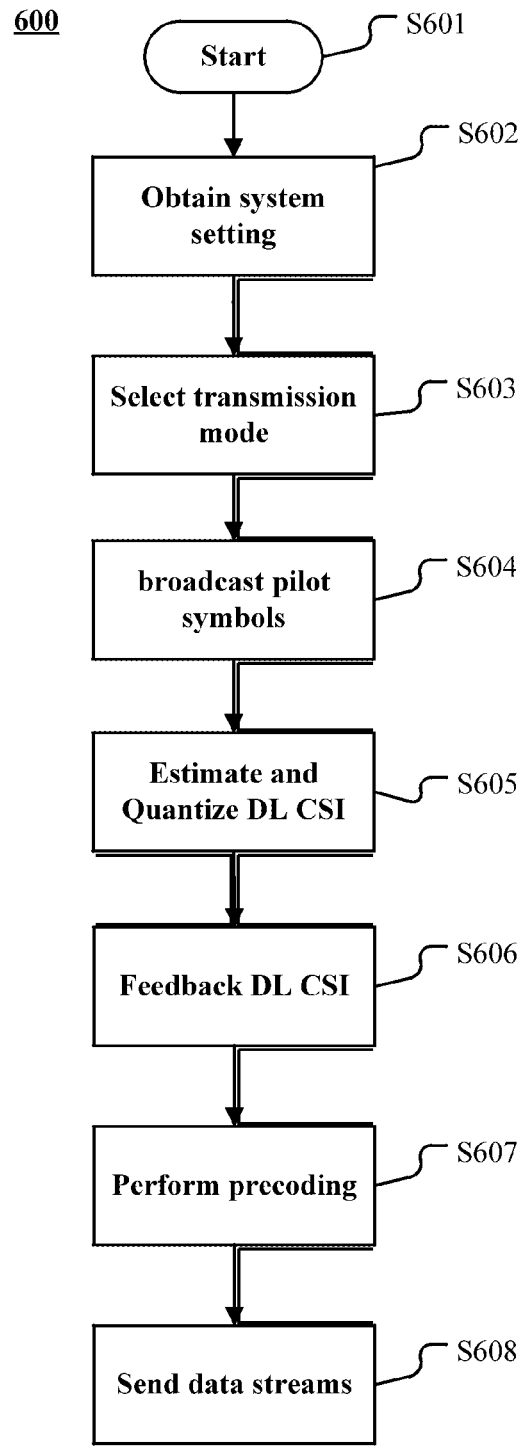
FIG. 6 illustrates an exemplary flowchart of a method 600 according to a first embodiment of the present invention.

FIG. 6 illustrates an exemplary flowchart of a method 600 according to a first embodiment of the present invention. The method 600 may be applied in a D2D communication system underlaying a FDD system, which means the downlink CSI may be obtained by limited feedback. Thus, the system setting as discussed above may further comprise a feedback size B of the downlink CSI.

As shown in FIG. 6, the method 600 may begin at the step S601 and proceed to the step S602. At the step S602, a system setting of the wireless communication system may be obtained. The step S602 of the method 600 is almost the same as the step S502 of the method 500 as illustrated in FIG. 5. The difference is that at the step S602, the feedback size B of the downlink CSI is also obtained for subsequent selecting of the transmission mode. Normally, the feedback size B of the DL CSI may be fixed or known beforehand.

Then, at the step S603, a transmission mode is selected based at least in part on the system setting, wherein the transmission mode is one of an IC transmission mode and a BF transmission mode. The selecting of the transmission mode aims at maximizing achievable channel capacity based on the obtained system setting.

Specifically, as discussed above, the selecting may be performed according to the operating regions e.g. as illustrated in FIG. 4, which shows whether IC or BF is preferred under certain system settings.

The curves 410 and 420 may be plotted based on the derived expressions (12) and (13) for the system throughput under different system settings, which gives closed-form throughput expressions for both BF and IC strategies under quantized CSI, respectively.

After selecting the transmission mode, the selected transmission mode will be configured. Specifically, the precoding vector w will be determined based on the downlink CSI.

As mentioned above, in the FDD system, the downlink CSI is obtained through limited feedback. In the embodiment as illustrated in FIG. 6, at the step S604, the BS 110 may broadcast pilot symbols at the beginning of each block. Then, at the step S605, the cellular UE0 120 and the D2D receiving UE1 121 can estimate the instantaneous downlink CSI and quantized the DL CSI according to a predetermined codebook, which is also known at the BS 110. At the step S606, the channel quantization index is sent back to the cellular BS 110, which is used to get the knowledge of the DL channel for the BS 110.

Then, at the step S607, the cellular BS 110 performs corresponding precoding based on the instantaneous CSI feedback from the step S606. The precoding method may be performed based on various existing techniques, and thus the description thereof is omitted here.

Finally, at the step S608, both the cellular BS 110 and the D2D transmitting UE2 122 may send data streams to their receivers. Also note that, the D2D transmitting UE2 122 requires no precoding as it is equipped with only a single antenna.

Figure 7:
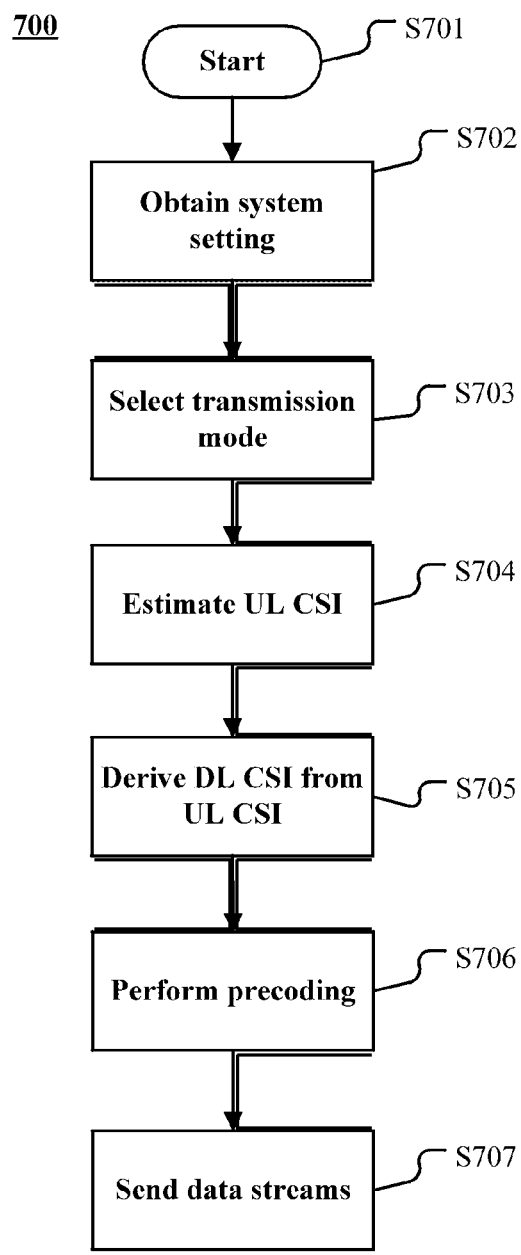
FIG. 7 illustrates an exemplary flowchart of a method 700 according to a second embodiment of the present invention.

FIG. 7 illustrates an exemplary flowchart of a method 700 according to a second embodiment of the present invention. The method 700 may be applied in a D2D communication system underlaying a TDD system, which means the downlink CSI may be obtained by uplink channel state information due to channel reciprocity. In other words, no DL CSI feedback is needed here, and the BF and IC strategies may be compared under perfect CSIT. Thus, the system setting as discussed above does not comprise a feedback size B of the downlink CSI.

As shown in FIG. 7, the method 700 may begin at the step S701 and proceed to the step S702. At the step S702, a system setting of the wireless communication system may be obtained. The step S702 of the method 700 is the same as the step S502 of the method 500 as illustrated in FIG. 5.

Then, at the step S703, a transmission mode is selected based at least in part on the system setting, wherein the transmission mode is one of an IC transmission mode and a BF transmission mode. The selecting of the transmission mode aims at maximizing achievable channel capacity based on the obtained system setting.

Specifically, as discussed above, the selecting may be performed according to the operating regions. In this embodiment, the operating regions may be obtained based on the derived expressions (9) and (10) for the system throughput under different system settings, which gives closed-form throughput expressions for both BF and IC strategies under perfect CSI, respectively.

Also, after selecting the transmission mode, the selected transmission mode will be configured. Specifically, the precoding vector w will be determined based on the downlink CSI.

As mentioned above, in the TDD system, the downlink CSI is obtained through uplink CSI. In the embodiment as illustrated in FIG. 7, at the step S704, the BS 110 may estimate uplink channel state information at the beginning of each block. Then, at the step S705, the BS 110 may derive DL CSI from the UL CSI. The algorithm for deriving DL CSI from the UL CSI is known in the art, and thus the description thereof is omitted here.

Then, at the step S706, the cellular BS 110 performs corresponding precoding based on the derived DL CSI at the step S705.

Finally, at the step S707, both the cellular BS 110 and the D2D transmitting UE2 122 may send data streams to their receivers. Also note that, the D2D transmitting UE2 122 requires no precoding as it is equipped with only a single antenna.

In the above two embodiments, the switching of BF and IC precoding strategies is performed at each block. In a third embodiment, the switching of BF and IC may be performed at each transmission, i.e., the selecting of BF and IC may be based on the instantaneous channel conditions.

Figure 8:
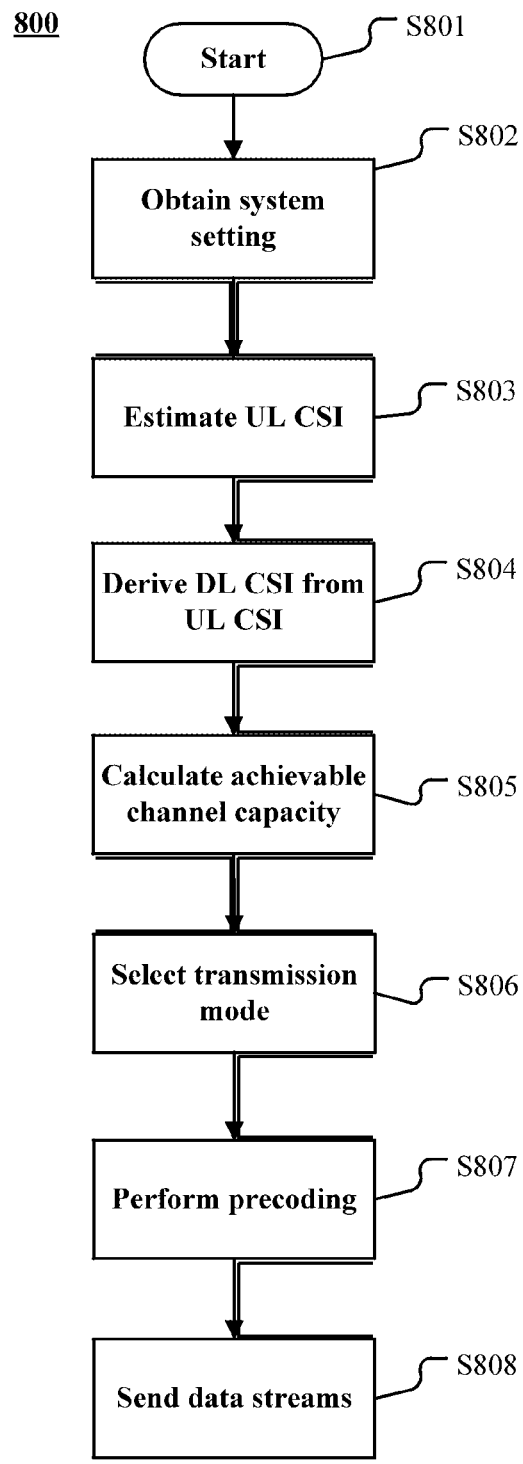
FIG. 8 illustrates an exemplary flowchart of a method 800 according to a third embodiment of the present invention.

FIG. 8 illustrates an exemplary flowchart of a method 800 according to a third embodiment of the present invention. As mentioned above, this embodiment performs switching of BF and IC at each transmission based on the instantaneous channel state information. Selecting of BF and IC needs full channel state information at the transmitter, including both directions and magnitudes, i.e., perfect CSIT. Thus the method 800 may be applied in a D2D communication system underlaying a TDD system, where full downlink CSI may be obtained by uplink channel state information due to channel reciprocity.

As shown in FIG. 8, the method 800 may begin at the step S801 and proceed to the step S802. At the step S802, a system setting of the wireless communication system may be obtained. The step S802 of the method 800 is the same as the step S502 of the method 500 as illustrated in FIG. 5.

Then, the instantaneous downlink CSI may be obtained for selecting the transmission mode. Specifically, at the step S803, the BS 110 may estimate uplink channel state information of both BS-UE0 and BS-UE1 links at the beginning of each transmission. Meanwhile, the D2D transmitting UE2 122 can estimate the UL CSI of both UE2-UE1 and UE2-UE0 links and this may also be used to derive the DL CSI.

Then, at the step S804, the BS 110 may derive DL CSI from the UL CSI due to channel reciprocity in the TDD system. At the same time, the D2D transmitting UE2 122 perfectly feeds the DL CSI of UE2-UE0 and UE2-UE1 links to the BS 110, which will be used in the precoding strategy switching in the following step S805.

Having obtained the instantaneous DL CSI, at the step S805, the BS 110 may calculate on site the achievable channel capacity for both the BF and IC strategies based at least in part on the DL CSI and the system setting as obtained at the step S802.

The calculation may be based on the equation (5) as discussed above.

For BF case, the precoding vector w may be calculated according to the equation (8). For IC case, the precoding vector w may be calculated as below:

$$w = w_0 / \|w_0\|$$

$$w_0 = (I - h_{B1}(h_{B1}^H h_{B1})^{-1} h_{B1}^H) h_{B0}$$

Then, at the step S806, the BS 110 compares and selects the optimal transmission mode which maximizes the achievable channel capacity as the precoding strategy to be used in this transmission.

Also, after selecting the transmission mode, at the step S807, the selected transmission mode will be configured. Specifically, the cellular BS 110 will use the precoding vector w as calculated at the step S805 to perform corresponding precoding for the selected transmission mode.

Finally, at the step S808, both the cellular BS 110 and the D2D transmitting UE2 122 may send data streams to their receivers. Also note that, the D2D transmitting UE2 122 requires no precoding as it is equipped with only a single antenna.

Figure 9:
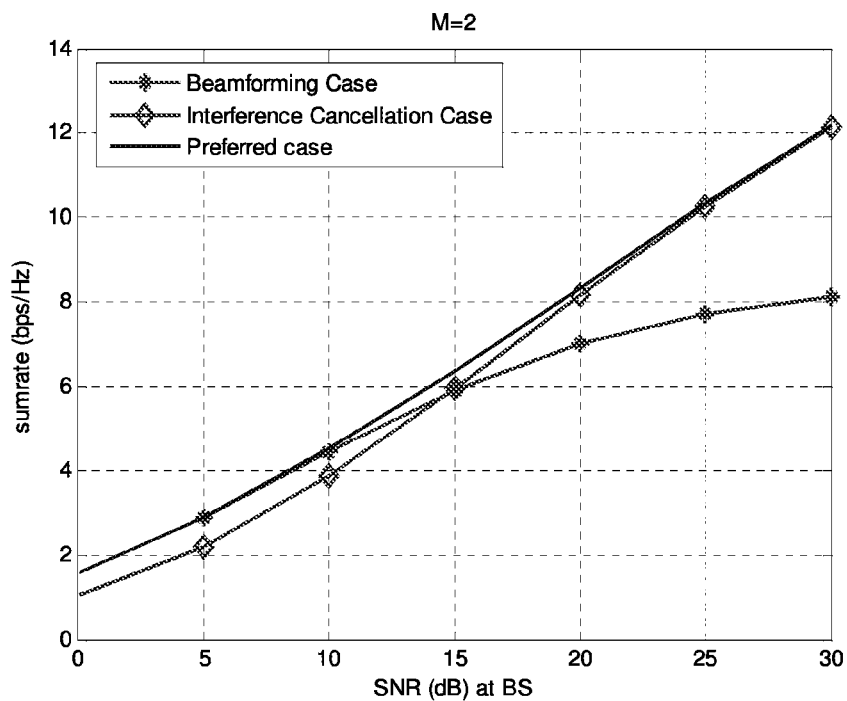
FIG. 9 illustrates the simulation results for BF Case, IC Case and the proposed switching mechanism according to the third embodiment of the present invention under perfect CSI.

FIG. 9 illustrates the simulation for BF Case, IC Case and the proposed switching mechanism according to the third embodiment of the present invention under perfect CSI. In the plot in FIG. 9, the horizontal axis represents SNR (dB) at the BS, and the vertical axis represents the sum capacity (bps/Hz). Other parameters are as follows: $M=2$, $P_2 = P_B/20$, $D_0 = 100$ m, $D_{B0} = 100$ m, $D_{B1} = 300$ m, $D_{21} = 40$ m, $D_{20} = 250$ m, $\alpha_{B0} = (D_0/D_{B0})^n$, and $\eta = 1.2$.

As shown in FIG. 9, the switching mechanism as implemented in the third embodiment can achieve even better system capacity performance than both IC and BF strategies. This is because the proposed switching mechanism is performed at each transmission, instead of at each block as implemented in the first and second embodiments.

Figure 10:
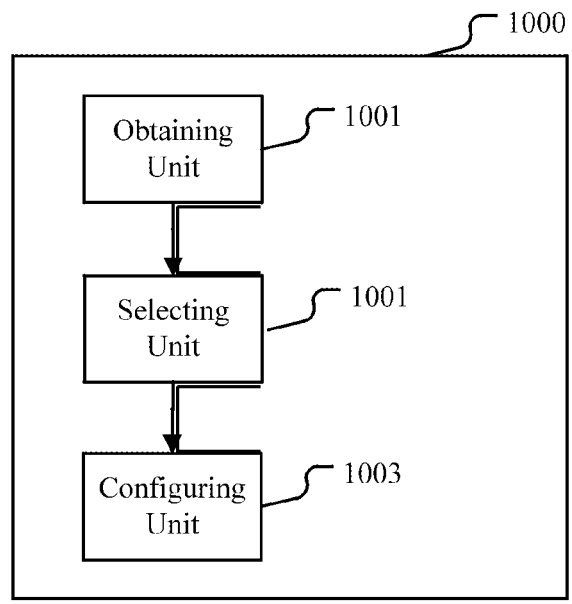
FIG. 10 is a schematic block diagram of an apparatus 1000 that may be configured to practice the exemplary embodiments of the present invention.

FIG. 10 is a schematic block diagram of an apparatus 1000 that may be configured to practice the exemplary embodiments of the present invention.

As shown in FIG. 10, the apparatus 1000 may comprise an obtaining unit 1001, a selecting unit 1002 and a configuring unit 1003. The apparatus 1000 may be incorporated in a BS and be configured to perform methods of the exemplary embodiments of the present invention. Alternatively, the apparatus 1000 may be incorporated in other network elements, or be distributed among various network elements, so as to perform the methods of the exemplary embodiments of the present invention.

The obtaining unit 1001 may be configured to obtain a system setting of the wireless communication system. The system setting may comprise transmit power at the BS 110 and transmit power at the D2D transmitting UE2 122; number of antennas at the BS 110; and path loss information of the D2D receiving UE1 121 and the cellular UE0 120. Optionally, the system setting may further comprise the feedback size of CSI.

To obtain the path loss information of the D2D receiving UE1 121 and the cellular UE0 120, the obtaining unit 1001 may be configured to inform the cellular UE0 120 and the D2D receiving UE1 121 of reference signal information of the D2D transmitting UE2 122; and receive the path loss information fed back from the cellular UE0 120 and the D2D receiving UE1 121.

The selecting unit 1002 may be configured to select a transmission mode based at least in part on the system setting, wherein the transmission mode is one of an IC transmission mode and a BF transmission mode. The selecting of the transmission mode aims at maximizing achievable channel capacity based on the obtained system setting by the obtaining unit 1001.

The configuring unit 1003 may be configured to configure the selected transmission mode. In particular, the precoding vector w for the selected transmission mode will be calculated based on the downlink channel state information.

Depending on different system configuration, for example TDD or FDD system, the obtaining unit 1001, the selecting unit 1002 and the configuring unit 1003 may be configured to implement different embodiments.

In a first embodiment where e.g., a FDD system is employed, the obtaining unit 1001 may be configured to further obtain the feedback size B of DL CSI. The selecting unit 1002 may be configured to select the transmission mode which maximizes achievable channel capacity based on the system setting. The achievable channel capacity may be calculated according to equations (12) and (13) for BF and IC strategies under quantized CSI, respectively.

Then, the configuring unit 1003 may be configured to broadcast pilot symbols, receive downlink channel state information feedback; and perform precoding for the selected transmission mode based on the downlink channel state information feedback.

In turn, the BS 110 and the D2D transmitting UE2 122 may send data streams to their receivers.

In a second embodiment where e.g., a TDD system is employed, the obtaining unit 1001 may be configured to obtain the system setting, such as transmit power at the BS 110 and transmit power at the D2D transmitting UE2 122, number of antennas at the BS 110, and path loss information of the D2D receiving UE1 121 and the cellular UE0 120.

The selecting unit 1002 may be configured to select the optimal transmission mode according to equations (9) and (10) for BF and IC strategies under perfect CSI, respectively.

Then, the configuring unit 1003 may be configured to estimate uplink channel state information; derive downlink channel state information from the uplink channel state information; and perform precoding for the selected transmission mode based on the downlink channel state information.

In turn, the BS 110 and the D2D transmitting UE2 122 may send data streams to their receivers.

In a third embodiment where e.g., a TDD system is employed, the obtaining unit 1001 may be configured to obtain the system setting, such as transmit power at the BS 110 and transmit power at the D2D transmitting UE2 122, number of antennas at the BS 110, and path loss information of the D2D receiving UE1 121 and the cellular UE0 120.

The selecting unit 1002 may be configured to select the optimal transmission mode according to instantaneous DL CSI. Specifically, the selecting unit 1002 may be configured to: obtain downlink channel state information; calculate achievable channel capacity for both the IC transmission mode and the BF transmission mode based at least in part on the downlink channel state information and the system setting; and select the transmission mode which maximizes the achievable channel capacity.

Obtaining the DL CSI may comprise estimating uplink channel state information; and deriving the downlink channel state information from the uplink channel state information due to channel reciprocity in TDD systems.

Calculating the achievable channel capacity may be based on the equation (5) as discussed above. For BF case and IC case, the calculation of the precoding vector w may refer to the discussion with respect to FIG. 8.

Then, the configuring unit 1003 may be configured to perform precoding for the selected transmission mode based on the downlink channel state information. Specifically, the precoding vector w as calculated by the selecting unit 1002 will be used to perform corresponding precoding for the selected transmission mode.

In turn, the BS 110 and the D2D transmitting UE2 122 may send data streams to their receivers.

Figure 11:
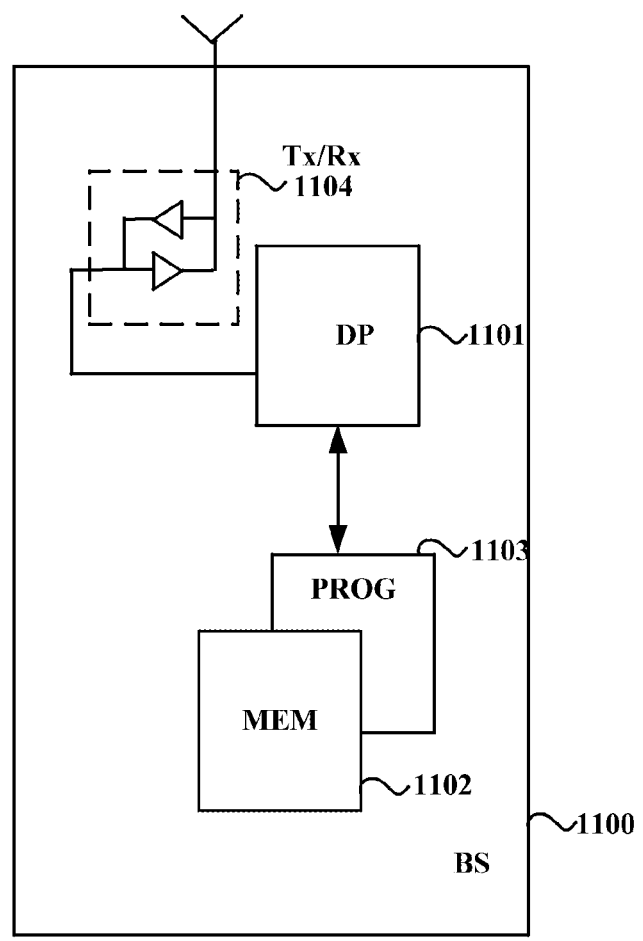
FIG. 11 illustrates a simplified block diagram of a BS 1100 that is suitable for use in practicing the exemplary embodiments of the present invention.

FIG. 11 illustrates a simplified block diagram of a BS 1100 that are suitable for use in practicing the exemplary embodiments of the present invention.

As shown in FIG. 11, the BS 1100 includes a data processor (DP) 1101, a memory (MEM) 1102 coupled to the DP 1101, and a suitable RF transmitter TX and receiver RX 1104 coupled to the DP 1101. The MEM 1102 stores a program (PROG) 1103. The TX/RX 1104 is for bidirectional wireless communications with UEs. Note that in embodiments of the present invention, the TX/RX 1104 has at least two antennas to facilitate communication, though in practice a BS may have one. The BS 1100 may be coupled via a data path to one or more external networks or systems, such as the internet, for example.

The PROG 1103 is assumed to include program instructions that, when executed by the associated DP 1101, enable the BS 1100 to operate in accordance with the exemplary embodiments of this invention, as discussed herein with the methods 500, 600, 700, or 800.

The embodiments of the present invention may be implemented by computer software executable by the DP 1101 of the BS 1100, or by hardware, or by a combination of software and hardware.

The MEM 1102 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the BS 1100, there may be several physically distinct memory units in the BS 1100. The DP 1101 may be of any type suitable to the local technical environment, and may include one or more of general purpose computers, special purpose computers, microprocessors, digital signal processors (DSPs) and processors based on multicore processor architecture, as non limiting examples. The BS 1100 may have multiple processors, such as for example an application specific integrated circuit chip that is slaved in time to a clock which synchronizes the main processor.

Although the above description has been described with a wireless communication system containing both cellular and D2D communications and for which closed-form expressions for the system throughput are derived, the skilled in the art should appreciate that the proposed switching mechanism may be applied in various communication systems where downlink interference may occur. For example, when same downlink frame allocation is used in neighbor cells, the downlink interference to edge UEs may occur. Also, similar closed-form expressions may be derived according to a certain system configuration with adaptive modifications.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for a base station (BS) in a wireless communication system, comprising:
    obtaining, by at least one processor, a system setting of the wireless communication system;
    selecting, by the at least one processor, a transmission mode based at least in part on the system setting, wherein the transmission mode is one of an Interference Cancellation (IC) transmission mode and a Beamforming (BF) transmission mode; and
    configuring, by the at least one processor, the selected transmission mode,
    wherein selecting the transmission mode further comprises: calculating achievable channel capacity for both the IC transmission mode and the BF transmission mode based at least in part on a downlink channel state information and the system setting.

2. The method of claim 1, in the wireless communication system, the BS communicates with a cellular user equipment (UE) via a cellular link and a Device-to-Device (D2D) transmitting UE communicates with a D2D receiving UE via a D2D link.

3. The method of claim 2, wherein the system setting comprises at least one or more of:
    transmit power at the BS and transmit power at the D2D transmitting UE;
    number of antennas at the BS; and
    path loss information of the D2D receiving UE and the cellular UE.

4. The method of claim 3, wherein obtaining the system setting further comprises:
    informing the cellular UE and the D2D receiving UE of reference signal information of the D2D transmitting UE; and
    receiving the path loss information fed back from the cellular UE and the D2D receiving UE.

5. The method of claim 1, wherein the system setting further comprises a feedback size of channel state information.

6. The method of claim 5, wherein selecting the transmission mode further comprises:
    selecting the transmission mode which maximizes achievable channel capacity based on the system setting.

7. The method of claim 5, wherein configuring the selected transmission mode comprises:
    broadcasting pilot symbols,
    receiving downlink channel state information feedback; and
    performing precoding for the selected transmission mode based on the downlink channel state information feedback.

8. The method of claim 1, wherein configuring the selected transmission mode comprises:
    estimating uplink channel state information;
    deriving downlink channel state information from the uplink channel state information; and
    performing precoding for the selected transmission mode based on the downlink channel state information.

9. The method of claim 1, wherein selecting the transmission mode further comprises:
    obtaining the downlink channel state information; and
    selecting the transmission mode which maximizes the achievable channel capacity.

10. The method of claim 9, wherein obtaining downlink channel state information further comprises:
    estimating uplink channel state information; and
    deriving the downlink channel state information from the uplink channel state information.

11. The method of claim 9, wherein configuring the selected transmission mode comprises:
    performing precoding for the selected transmission mode based on the downlink channel state information.

12. An apparatus for a base station (BS) in a wireless communication system, comprising:
    an obtaining unit, configured to obtain a system setting of the wireless communication system;
    a selecting unit, configured to select a transmission mode based at least in part on the system setting, wherein the transmission mode is one of an Interference Cancellation (IC) transmission mode and a Beamforming (BF) transmission mode; and
    a configuring unit, configured to configure the selected transmission mode,
    wherein the selecting unit is further configured to:
    calculate achievable channel capacity for both the IC transmission mode and the BF transmission mode based at least in part on the downlink channel state information and the system setting.

13. The apparatus of claim 12, in the wireless communication system, the BS communicates with a cellular user equipment (UE) via a cellular link and a Device-to-Device (D2D) transmitting UE communicates with a D2D receiving UE via a D2D link.

14. The apparatus of claim 13, wherein the system setting comprises at least one or more of:
    transmit power at the BS and transmit power at the D2D transmitting UE;
    number of antennas at the BS; and
    path loss information of the D2D receiving UE and the cellular UE.

15. The apparatus of claim 14, wherein the obtaining unit is further configured to:
    inform the cellular UE and the D2D receiving UE of reference signal information of the D2D transmitting UE; and
    receive the path loss information fed back from the cellular UE and the D2D receiving UE.

16. The apparatus of claim 12, wherein the system setting further comprises a feedback size of channel state information.

17. The apparatus of claim 16, wherein the selecting unit is further configured to:
    select the transmission mode which maximizes achievable channel capacity based on the system setting.

18. The apparatus of claim 16, wherein the configuring unit is further configured to:
  broadcast pilot symbols,
  receive downlink channel state information feedback; and
  perform precoding for the selected transmission mode based on the downlink channel state information feedback.

19. The apparatus of claim 12, where the configuring unit is further configured to:
  estimate uplink channel state information;
  derive downlink channel state information from the uplink channel state information; and
  perform precoding for the selected transmission mode based on the downlink channel state information.

20. The apparatus of claim 12, wherein the selecting unit is further configured to:
  obtain the downlink channel state information; and
  select the transmission mode which maximizes the achievable channel capacity.

21. The apparatus of claim 20, wherein obtaining downlink channel state information further comprises:
  estimating uplink channel state information; and
  deriving the downlink channel state information from the uplink channel state information.

22. The apparatus of claim 20, wherein the configuring unit is further configured to:
  perform precoding for the selected transmission mode based on the downlink channel state information.

* * * * *